T. DAVIS
METHOD OF MAKING PERFORATED BLOWN RUBBER ARTICLES.
APPLICATION FILED AUG. 11, 1921.
1,409,154.
Patented Mar. 14, 1922.
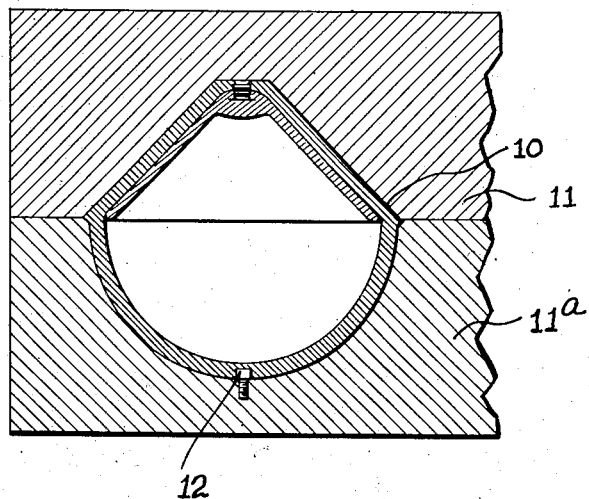
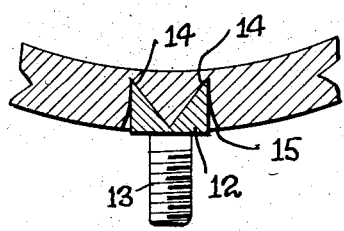
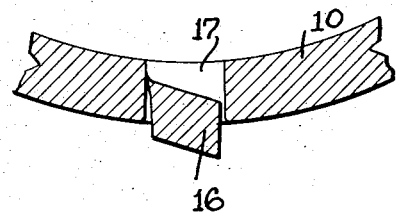
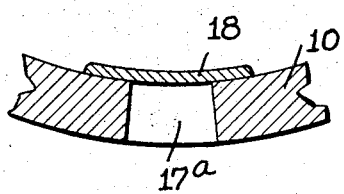
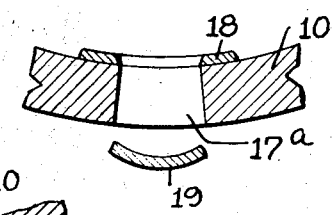
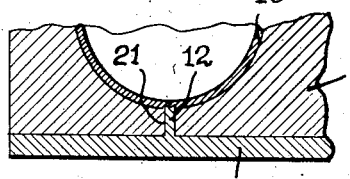
INVENTOR
THERON DAVIS.
BY
W. B. Hutchinson,
ATTORNEY

UNITED STATES PATENT OFFICE.

THERON DAVIS, OF NEW YORK, N. Y.

METHOD OF MAKING PERFORATED BLOWN RUBBER ARTICLES.

1,409,154. Specification of Letters Patent. Patented Mar. 14, 1922.

Application filed August 11, 1921. Serial No. 491,402.

*To all whom it may concern:*

Be it known that I, THERON DAVIS, a citizen of the United States, residing in the city, county, and State of New York, have invented new and useful Improvements in the art of Methods of Making Perforated Blown Rubber Articles, of which the following is a full, clear, and exact description.

The object of my invention is to provide a simpler and cheaper means of perforating blown goods or like material such as tank balls, bulbs and similar articles or which are finally formed or molded in the molds by the use of an expanding gas or gaseous substance so that after vulcanization the gas is released and air admitted. Balls or bulbs of this character are commonly called blown rubber goods. While being formed a small amount of ammonia, alcohol, water or other substance which expands with heat, is introduced into the article. The ball thus formed is placed within a strong mold whose interior cavity is of the desired shape, and the mold subjected to heat in any ordinary or preferred way. The expanding substance is converted into gas or steam which exerts sufficient force to make the exterior of the article exactly correspond to the interior shape of the mold. If the mold members are separated while the gas is expanded, the article will burst open or be forced out of shape. For this reason the customary method is to cool off the mold before separating the members. Then the internal pressure is not only reduced but a partial vacuum is formed within the article causing it to collapse. After being thoroughly cooled a hole is drilled in one portion of the article and the admission of air causes the article to resume the shape given to it by the mold. It is obvious that time is required to cool the mold so the article can be removed and time and labor is required in drilling the desired hole. It also will be obvious that the degree of collapse will vary and the irregular shape of the collapsed article makes it difficult to drill in the required place and as a result imperfect articles or seconds frequently occur.

My invention obviates these difficulties by causing a hole of the desired size and location to be made by the expanding gas within the article itself as soon as the molds are separated, or external pressure removed opposite the point where the hole is to be made. The molds need not be cooled before separation or they may be partially cooled to facilitate handling by being dipped in water. It is necessary, however, to separate the mold members before the expanding gas has cooled.

I accomplish this result by weakening the wall of the article under treatment at the point where the hole is to be made and before vulcanization so that the expanding or pressure gases within the article will blow out the weakened section when the article is removed from the mold. One way of doing this is to securely fasten in one of the mold members at the point where the hole is desired, a small spud preferably of metal, of the approximate diameter of the desired hole and of a length or height approximately equalling the thickness of the rubber or similar material used. The top portion of this spud is recessed or hollowed out in such a manner that a sharp edge is formed around the top of the spud. During vulcanization, the expanding gas causes the rubber or similar material to conform with the mold cavity and the spud becomes embedded in the material, the sharp edges of the spud cutting nearly through the material. If the spud cut entirely through the material the gas might escape so it is advisable to allow for a thin coating of material above the cutting edges of the spud. As soon as the article is vulcanized and the mold members separated the spud withdraws from the material and the expanding gas causes the thin layer of unperforated material to be blown outwards, permitting the gas to escape and the air to be admitted. My experiments show that sometimes the thin layer of rubber not fully punctured does not break at once but is forced out, forming a small drop or knob at the hole point. This readily brushes off by a touch of the finger and the hole left has all the advantages of a drilled hole and will always be of the desired size and at the desired location.

By a modification shown in the drawings I accomplish this result in another way. In the forming of a ball or bulb, a hole is made in the unvulcanized material of the desired size and in the desired location. Before the article is sealed there is placed over this hole on the inner side of the article a thin strip or disc of rubber that contains no hardening or vulcanization agent and which is pressed closely against the inner surface of the article. During the process of vulcanization this strip or disc of rubber does not harden and when the mold members are separated after vulcanization, the pressure of gas within the article causes a section of the unvulcanized rubber to be blown through the previously formed hole and the gas escapes and the air is freely admitted to the formed article.

By a further modification shown in the drawings I accomplish this result in still another way. A hole is made through one member of the mold in the position of the desired hole in the article to be formed. A spud with a cutting edge surrounding a recess at the top is inserted in this hole. The spud has its lower end fastened to a plate, so that it can be withdrawn by removing the plate and the internal gas pressure blows out that portion of the wall of the article weakened by the cutting edge of the upper end of the spud. It is obvious that the plate may carry a multiple of spuds fitted in opposing mold cavities so that all the spuds will be removed by removing the plate holding the spuds.

Another important advantage of my invention is that by the process in ordinary use the ball collapses while the material is still warm and this tends to injure the elasticity of the material. By means of my invention the unvulcanized article does not collapse and there is less liability of imperfect articles resulting.

These and other objects of my invention will be better understood from the description which follows and from the drawing which illustrates a way of carrying my invention into effect in which similar characters refer to similar parts throughout the several views.

Figure 1 is a broken detail section of a tank ball mold and ball showing my invention.

Figure 2 is a broken cross section showing the cutting step of my invention.

Figure 3 is a cross section of Figure 2 after the molds are separated.

Figure 4 is a cross section of a modification of my invention.

Figure 5 is a cross section of Figure 4 after the mold members are separated.

Figure 6 is a detailed section showing another way of carrying out my invention.

In the drawings I have shown a simple way of carrying my invention into effect in which a tank ball 10 is illustrated in Figure 1 in its position in the two part vulcanizing mold 11. Obviously the tank ball may be any blown article, such as balls, bulbs or the like and the mold can be of any usual or preferred type.

In Figures 1 to 3, I have shown how the wall of the ball 10 can be weakened at the desired point by the use of a spud 12 which as shown has a threaded shank 13 adapted to screw into the bottom portion of the mold member 11ª. This spud has a cutting edge 14 and the thickness of the spud is such that when the mold members are closed and an internal pressure exerted on the wall of the ball 10, the spud will cut nearly but not quite through the wall as shown at 15 in Figure 2. When the mold members are partly cooled and separated so as to relieve the external pressure the internal pressure will still be sufficient to blow out the section 16, see Figure 3, which has been weakened by the spud 12, and a clean hole, 17, results. The foregoing illustrates a simple way of carrying my invention into effect. Obviously the particular construction of the spud and the manner in which it is secured in the mold have nothing to do with the invention as any suitable member can be carried in the mold so as to weaken the wall of the ball at the desired point.

In Figures 4 and 5 I have illustrated another way of weakening the wall of the ball at the desired point. As here shown the wall 10 is pierced at the desired point by a hole 17ª and a thin piece or strip of unvulcanizable rubber 18, is laid over the hole on the inner side of the ball. This will effect a closure and will not be blown out so long as the ball is supported in the vulcanizing mold, but when the external pressure is released a section 19 of the strip 18 will be blown out through the hole 17ª leaving a clean perforation at the desired point.

In Figure 6 I have shown still another simple way of carrying the invention into effect, and as here illustrated it is not necessary to have the mold members separated or cooled. In this instance the lower member 11ª has a plate 20 beneath, and is perforated as shown at 21 to permit the spud 12 to be secured to said plate and to enter the hole 21. The plate 20 can move with the mold member so that when the mold members are brought together the spud 12 will weaken the wall 10 of the ball as already described. When vulcanization is complete or carried to the desired point the plate 20 and spud 12 can be drawn back from the mold member 11ª thus leaving the open perforation 21, and the heavy internal pressure will immediately blow out the section of the wall 10 opposite the said perforation 21, the severed section passing out through said perforation.

These several illustrations make it clear that my invention is not dependent upon any apparatus or device. That it consists broadly in weakening the wall of a blown article, at the point where the perforation is to be made so that the internal pressure of the ball will blow out a section of the wall at the desired point and that many devices might be employed for weakening the wall for the purpose specified.

It will be understood by any one skilled in the art, that in most cases it is desirable to cool the mold members to a certain extent before removing the ball from them but this cooling should not be carried far enough to reduce the internal pressure in the ball too much, as otherwise said pressure would not be sufficient to blow out the hole section at the desired point. Where the form of apparatus shown in Figure 6, is used cooling is not necessary.

I claim:

1. The improvement in the art of perforating blown rubber articles such as are vulcanized in a mold and with internal pressure, which consists in weakening the wall of the article under treatment at the point to be perforated, so that the internal pressure of said article will blow out the section at said weakened point.

2. The improvement in the art of perforating blown rubber articles such as are vulcanized in a mold and provided with internal pressure, which consists in weakening the wall of said article under treatment at the point to be perforated and maintaining external pressure upon the part at said weakened point until vulcanization is completed and then removing such external pressure, whereby a section of the hole will be blown out at the weakened point.

3. The improvement in the art of perforating blown rubber articles such as are vulcanized in a mold and subjected to internal pressure, which consists in weakening the wall of said article under treatment at the point to be perforated, while it is subject to pressure in the mold, whereby, when the external pressure is removed the said hole will be blown through at the weakened point.

4. The improvement in the art of perforating blown rubber articles such as are vulcanized in a mold and provided with internal pressure, which consists in partially perforating the wall of the article at the desired point while said article is in the mold and still subject to internal pressure and then removing the external pressure opposite the point to be perforated, whereby the weakened part will be blown out.

THERON DAVIS.

Witnesses:
JAY EMANUEL,
WARREN B. HUTCHINSON.